Aug. 6, 1935. W. D. MARING 2,010,549
AEROPLANE WING
Filed Oct. 18, 1933 3 Sheets-Sheet 2
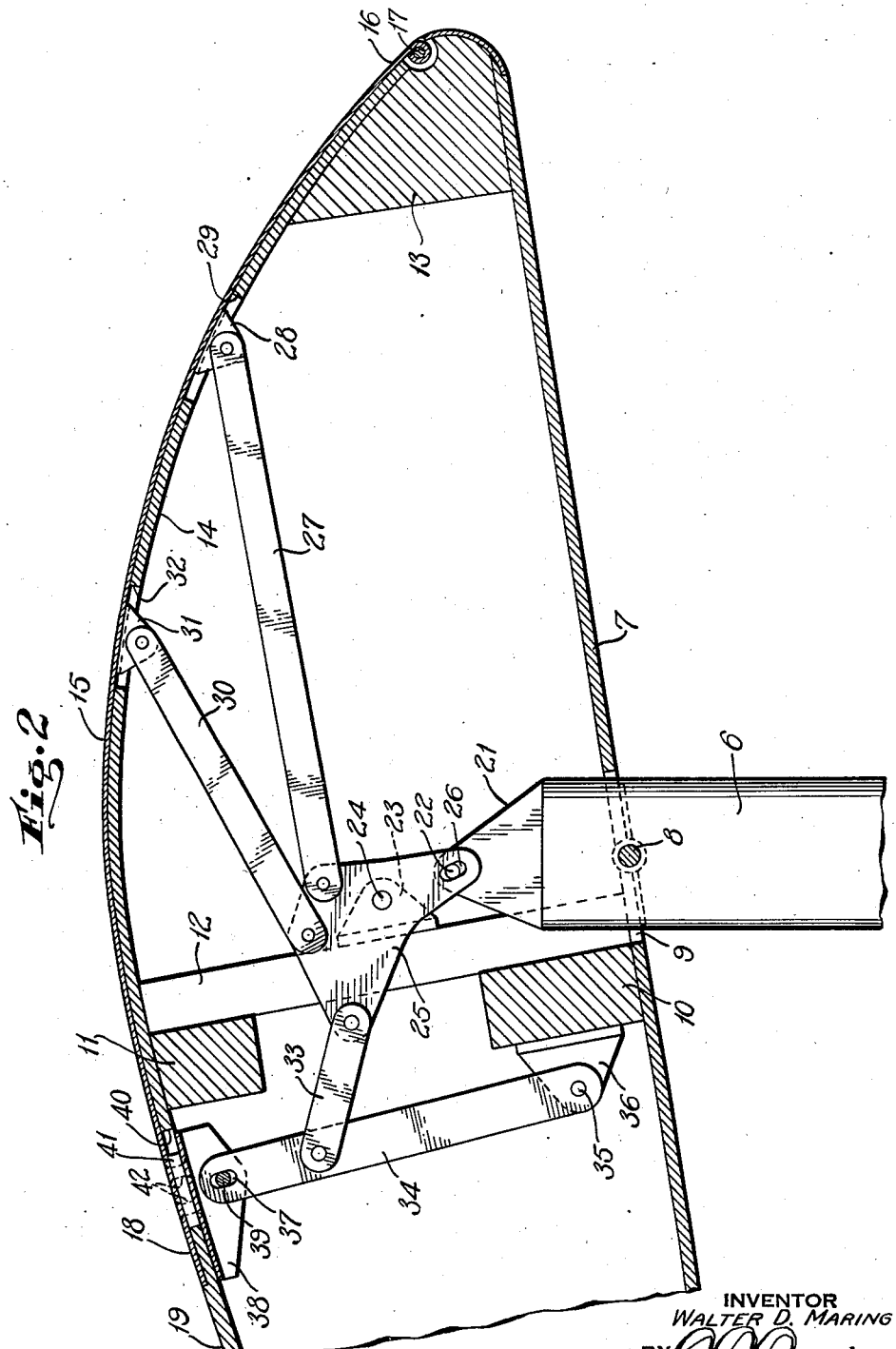
INVENTOR
WALTER D. MARING
BY
ATTORNEY Aug. 6, 1935.    W. D. MARING    2,010,549
AEROPLANE WING
Filed Oct. 18, 1933    3 Sheets-Sheet 3
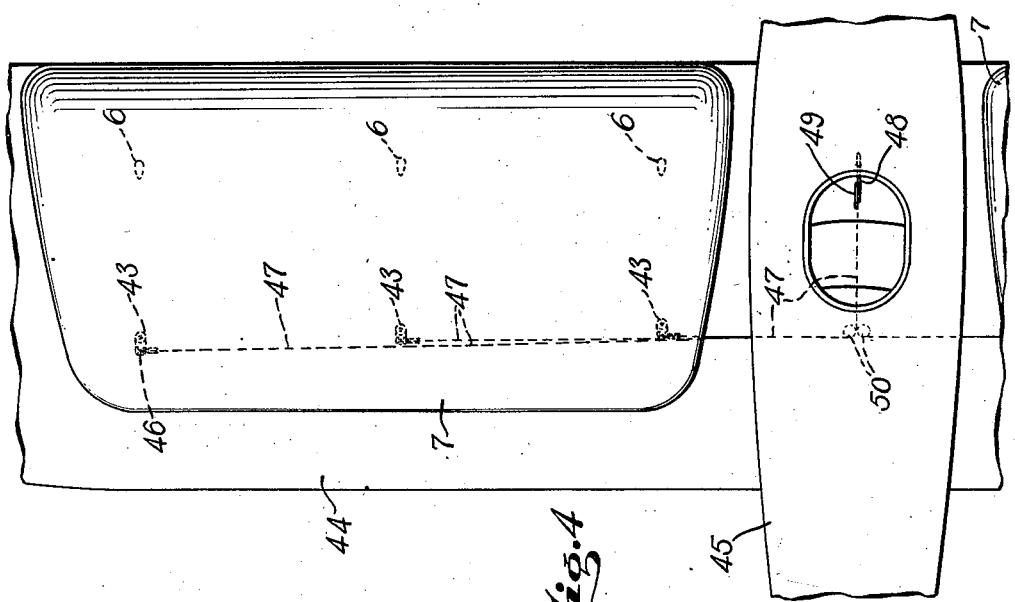
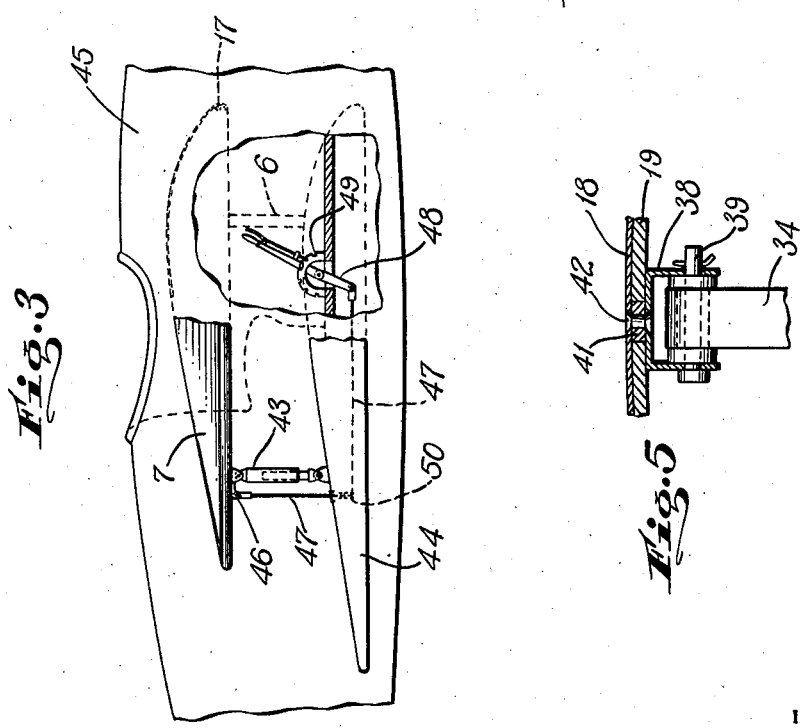
INVENTOR
WALTER D. MARING
BY
ATTORNEY Patented Aug. 6, 1935

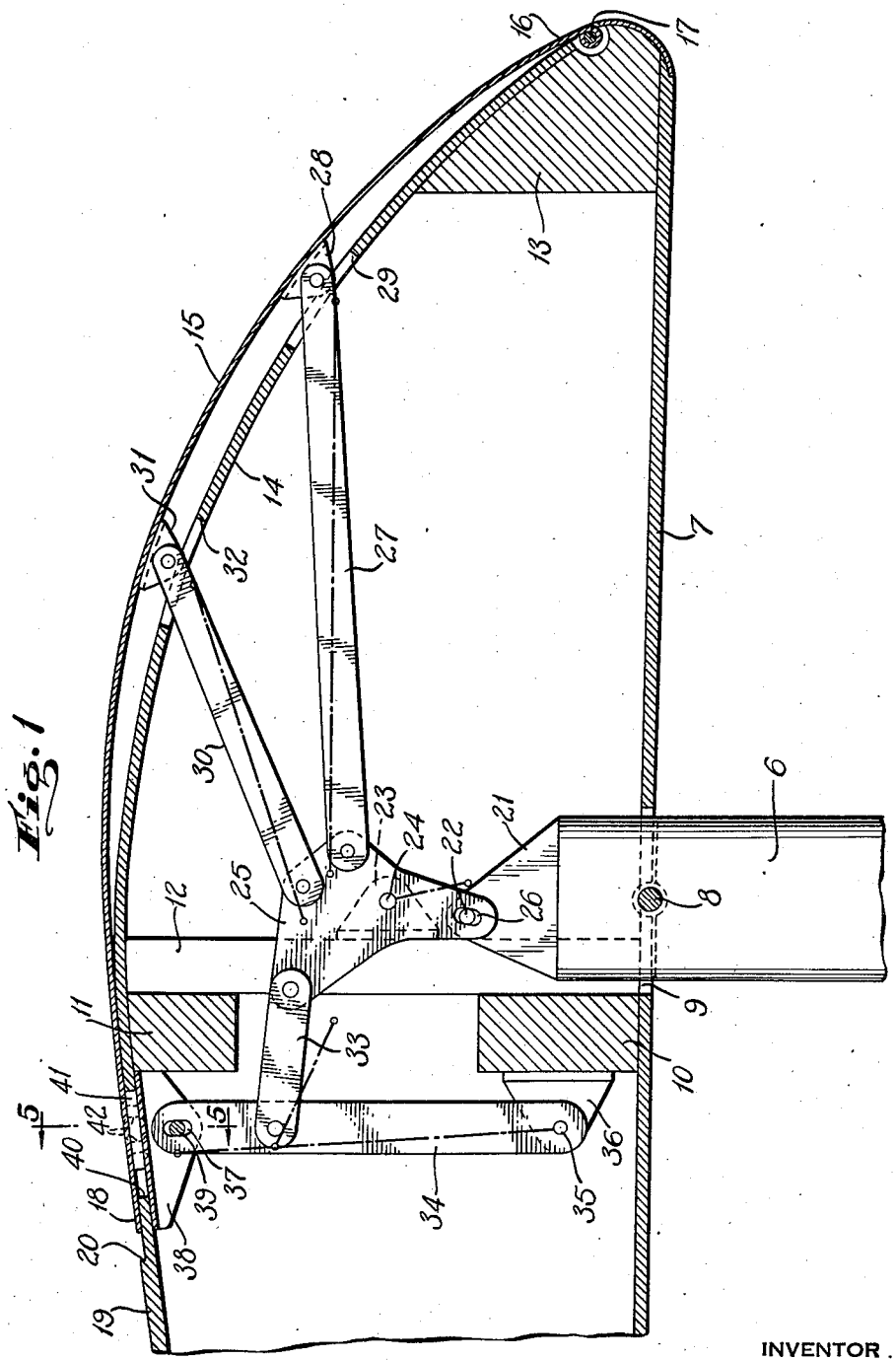

2,010,549

UNITED STATES PATENT OFFICE 2,010,549

AEROPLANE WING

Walter D. Maring, Brooklyn, N. Y., assignor to J. Joseph Mandelbaum and Don M. McAllister, copartners, doing business as McAllister Aircraft Wing Co., Albany, N. Y.

Application October 18, 1933, Serial No. 694,073

10 Claims. (Cl. 244—12)

This invention relates to aeroplane wings.

In aeroplane construction it is highly desirable to provide a wing structure which will have a minimum of resistance during normal flight so that greater speed may be attained. It is also desirable to provide a wing construction which will offer a greater resistance so as to permit of a low landing speed and also greater lift for the purpose of taking off or climbing. Both desirable results cannot be achieved with a fixed wing. Both results can be obtained by providing a wing in which the angle of attack may be varied.

It is well known that a large number of wing constructions have been designed with a variable angle of attack to effect the results above set forth. It is equally well known that a large number of wing constructions so designed are not practical and will not operate successfully. Therefore, the broad object of this invention is to provide a practical wing construction in which the angle of attack may be varied to permit a low landing speed and greater lift on taking off, and yet permit a greater speed during normal flight.

A further object of the invention is to provide a wing construction for the purpose above set forth, which may be incorporated in the ordinary wings of an aeroplane, or which may be used as an auxiliary wing in combination with the usual fixed wings of an aeroplane.

A further object of the invention is to provide a wing construction pivoted with relation to the fuselage, so that the trailing edge may be depressed and the leading edge raised so that the desired results may be obtained while the aeroplane is maintained on an even keel.

It is well known that a large part of the lift is obtained by producing a partial vacuum on the top of the wing at a point behind the leading edge. Where a pivoted wing is used and the leading edge raised while the trailing edge is lowered, a condition results wherein the vacuum or center of pressure is changed. This results in very unstable flight and when the change in the location of the vacuum is considerable, it will result in a stall or slip. Therefore, a further object of the invention is to provide a pivoted wing construction in which the angle of attack may be varied but which will maintain the vacuum or center of pressure in its normal position with relation to the upper surface of the wing.

In order to overcome the instability of flight and to prevent the possibility of a stall or slip it is necessary to change the camber of the upper side of a leading edge as the angle of attack is changed. In this way, the vacuum or center of pressure may be maintained in its proper position even though the angle of attack is changed. Therefore, a further object of the invention is to provide a means to change the camber of the leading edge when the angle of attack is changed.

The degree of change in the camber of the wing should be proportionate to the change of the angle of attack. It is not practical to use one manual means to move the wing on its pivot to change the angle thereof and a separate means to change the camber. Therefore, a further object of the invention is to provide a manually operated means to move the wing and means automatically controlled by the movement of the wing to change the camber of the leading edge in proportion to the change in the angle of the wing.

The change in the camber of the leading edge is accomplished by providing a flexible leading edge superimposed on the normal leading edge. Under normal conditions the flexible edge is flexed outward between its front and rear edges so as to assume one of the standard aerofoil curves. To change the camber the rear edge of the flexible portion is retracted, causing the flexible leading edge to lie close against the normal leading edge and to assume a different standard curve. Therefore, a further, specific object of the invention is to provide a flexible, retractable leading edge on an aeroplane wing.

A further object of the invention is to provide means to lock the leading edge in one position or another in order to prevent unintentional change of camber.

Since a relatively small change in angle and camber is sufficient to achieve the desired results and a too great change might be disastrous, a further object of the invention is to provide a pivoted wing with a retractable leading edge, the possible range of movement of which will be only within predetermined safe limits.

The invention consists of the construction, combination and arrangement of parts, as herein illustrated, described and claimed.

In the accompanying drawings, forming part hereof, is illustrated one form of embodiment of the invention as applied to auxiliary wings, the structural changes necessary to apply the invention to a regular wing being obvious from the drawings, in which drawings similar reference characters designate corresponding parts, and in which:

Figure 1 is a vertical section from front to rear of the leading edge of a wing showing the leading edge in normal position;

Figure 2 is a vertical section similar to Figure 1 but showing the leading edge retracted and the nose of the wing raised;

Figure 3 is a side elevation, partly broken away, showing the means to control the trailing edge of the wing;

Figure 4 is a plan view, partly broken away, showing the trailing edge control; and, Figure 5 is a fragmentary detail in vertical section showing the means to connect the rear portion of the trailing edge to its operating means.

Referring to the drawings, and particularly to Figures 1 and 2, 6 designates a strut extending up from the main wing of an aeroplane. An auxiliary wing 7 is carried by the strut 6 by means of a pivot 8. At the point where the strut 6 enters the wing 7 an opening 9 is provided in the wing 7 to permit movement of the wing 7 with relation to the strut 6. The wing 7 is provided with a lower longitudinal spar 10 and an upper longitudinal spar 11. Adjacent the spars 10 and 11 is disposed a vertical rib 12. The wing 7 is provided with a solid nose piece 13. Suitable additional ribs and re-inforcing means may be supplied in the wing 7, but are neither shown nor described, since they form no part of this invention.

14 designates the fixed leading edge, the curve of which is an accepted standard curve. Superimposed on the leading edge 14 is a second leading edge 15 of flexible material having its front edge 16 carried by a pivot 17 in the nose piece 13. The rear edge 18 of the flexible member 15 is disposed adjacent the upper surface 19 of the wing 7. The upper surface 19 is recessed at 20 so that when the rear edge 18 is retracted as hereinafter described the upper surface of the wing will be smooth.

On the upper end of the strut 6 is disposed a head 21 carrying a pin 22. For the purpose of construction all pins and pivots are standard clevis pins approved by the government for aeroplane construction. Secured to the rib 12 above the upper end of the strut 6 is a bracket 23 having thereon a pivot 24. Carried by the pivot 24 is an operating plate 25 having a downward extension, which extension is provided with an elongated slot 26 through which is disposed the pin 22.

On the forward edge of the plate 25 is pivoted the rear end of a link 27 having its forward end pivoted to a bracket 28 which is secured to the flexible edge 15. A slot 29 is provided in the fixed edge 14 for the passage of the link 27. Above the link 27 is disposed a second shorter link 30 having its rear end pivoted to the plate 25 and its forward end pivoted to a bracket 31 secured to the flexible leading edge 15. A slot 32 similar to the slot 29 is provided in the fixed edge 14 to permit the passage of the link 30.

Pivotally carried by the rear portion of the plate 25 is a short connecting link 33 having its rear end pivoted to a vertical link 34. The lower end of the link 34 is pivoted at 35 to a bracket 36 carried by the longitudinal spar 10. The upper end of the link 34 is provided with a slot 37 and the link 34 is connected to a slidable bracket or shoe 38 by means of a clevis pin 39 disposed through the shoe 38 and the slot 37 of the link 34.

The upper surface 19 of the wing 7 is slotted as shown at 40 to receive a spacer 41 to secure the rear edge 18 of the member 15 to the bracket or shoe 38. Suitable rivets 42 may be disposed through the edge 18, the spacer 41 and the top of the bracket 38 so that the spacer 41 will move in the slot 40 while the edge 18 bears against the upper surface 19, and the bracket 38 bears against the under side of the surface 19. By reason of the rivets 42 the edge 18, the spacer 41 and the bracket 38 will move as a unit.

The operation of the device is as follows:

Under normal conditions the auxiliary wing 7 and the parts heretofore described are in the positions shown in Figure 1. In this position the wing 7 offers a minimum resistance so that a maximum speed may be attained. When it is desired to land or under other conditions where an increased lift or reduced speed is desired, the trailing edge of the wing 7 is depressed by means hereinafter described. This rocks the wing 7 on its pivot 8 and raises the forward edge of the wing 7. As the wing 7 is moved on its pivot the vertical rib 12 is rocked rearwardly carrying with it the bracket 23 to which is pivoted the plate 25 by means of the pivot 24. Since the lower portion of the plate 25 is prevented from relative movement by reason of the pin 22 the plate 25 is partially rotated on its pivot 24. As the plate 24 moves the links 27 and 30 are drawn rearwardly of the wing 7 thereby drawing the flexible member 15 down against the leading edge 14 of the wing 7. At the same time the link 33 forces the vertical link 34 backward and since the lower end of the vertical link 34 is held by the pivot 35 the upper end of the link 34 forces the bracket 38 backwards. This retracts the rear edge 18 of the flexible member 15 to the limit of the offset 20 of the upper surface 19. The parts are now in the positions shown in Figure 2.

It will be noted that the retraction of the flexible member 18 is limited in three ways: When the member 15 lies against the member 14 it cannot move further; when the edge 18 abuts the offset 20 the member 15 cannot move further in a rearward direction. When the spacer 41 reaches the rearward extremity of the slot 40 further movement is impossible. Therefore, the range of movement of the flexible leading edge 15 in a rearward direction is definitely limited.

When the parts are moved from the position shown in Figure 2 to the position shown in Figure 1 the bracket or shoe 38 will abut the upper longitudinal spar 11 and thereby limit the forward movement, and consequent curvature of the flexible member 15. It will be obvious that the elements, and particularly the member 15, may be placed in any position between the extreme positions shown in Figures 1 and 2, depending upon the amount of movement given to the wing 7 on its pivot 8. For practical purposes the wing 7 and the moving parts thereof do not have to be moved to their full extent. In fact, the angle by which the lower edge of the wing 7 as shown in Figure 2 varies from the horizontal is exaggerated for the purpose of more clearly illustrating the various positions taken by the moving parts.

In Figure 1 the broken lines indicate the mean centers between the pivots when the parts are in the positions shown in Figure 2. From this it can be seen that when the plate 25 is moved from the position shown in Figure 1 to the position shown in Figure 2, the pivots on the inner ends of the several links cross the center line of stress so that the links are locked in position and any pressure exerted axially of the links merely serves to hold them more securely in place. Conversely, when the several links are in the position shown in Figure 1 any pressure on the edge 15 resulting in axial pressure on those several links merely serves to hold them in their proper positions, instead of having a tendency to permit the edge 15 to be unintentionally retracted.

It will be obvious that when the wing 7 is in the position shown in Figure 1 the center of pressure or partial vacuum will maintain a definite position on the upper side of the wing 7. If the nose of the wing 7 were elevated without retracting the flexible edge 15, the vacuum would be moved and a relatively small change in the angle of the wing 7 would be sufficient to move the vacuum to an extent which would result in a stall or slip. However, by retracting the edge 15 and decreasing the camber as the nose of the wing 7 is elevated, the vacuum or center of pressure will be maintained in the same relative position on the upper side of the wing 7 as when the wing 7 is in the position shown in Figure 1.

In order to operate the wing 7 means must be provided to depress the trailing edge of the wing 7. Many different mechanisms may be utilized to depress the trailing edge of the wing 7, any one of which will work equally well in combination with the parts heretofore described. For the purpose of this disclosure, in order to show a complete operative device, a simple mechanism for depressing the trailing edge of the wing 7 is shown in Figures 3 and 4.

Referring to Figures 3 and 4, 43 designates a rear strut connecting the wing 7 and a regular fixed wing 44. The strut 43 is telescopic and is pivoted to the respective wings in order to permit relative movement between the wing 7 and the wing 44. 45 is the fuselage to which the wing is fixed.

Secured to the under side of the wing 7 adjacent the strut 43 is an eyelet 46 or other securing means, to which is connected a flexible cable or wire 47. The wire 47 runs vertically into the wing 44 and thence horizontally through the wing 44 to the fuselage 45, and is connected to a pivoted lever 48 provided with the usual type of quadrant 49. Appropriate sheave wheels 50 are disposed along the path of the control wire 47 between the connection 46 and the lever 48.

As can be seen from Figure 4 a plurality of wires 47 are provided. The parts shown in Figure 1 are duplicated in each wing 7 wherever a strut 8 extends upward from the wing 44. Depending on the nature and size of the aeroplane, two or more sets of mechanisms may be used in each wing. As shown by Figure 4 a plurality of wires 47 will pass through the wing 44 and for the purpose of providing uniformity of control the several wires 47 may be braided into a single cable when they enter the fuselage 45 so that action of the lever 48 will exert an equal pressure on each wire 47.

When the parts are in the positions shown in Figure 1 and the pilot wishes to move the wing 7, the lever 48 is operated rearwardly which pulls the trailing edge of the wing 7 downward. This is the only action necessary to both change the angle of attack and change the camber of the leading edge. When it is desired to return the parts to the position shown in Figure 1, the lever 48 is simply released and the air pressure on the under side of the trailing edge of the wing 7 together with the air pressure on the leading edge 15, will quickly turn the wing 7 on its pivot 8 and bring the parts to the position shown in Figure 1.

Having thus fully described the invention, what is claimed as new and desired to be secured by Letters Patent is:

1. In an aeroplane, a pivoted wing having an undeformable bottom surface, means to move the wing on its pivot and means controlled by the movement of the wing on its pivot to change the curvature of the forward portion of the wing.

2. In an aeroplane, a pivoted wing having an undeformable bottom surface, means to move the wing on its pivot and means controlled by the movement of the wing on its pivot to simultaneously change the curvature of the forward portion of the wing.

3. In an aeroplane, a pivoted wing having an undeformable bottom surface, means to move the wing on its pivot and means to automatically change the curvature of the forward portion of the wing in proportion to the degree of movement of the wing on its pivot.

4. In an aeroplane wing having a variable angle of attack and having a relatively inflexible bottom portion, a retractable forward portion and means controlled by variation in the angle of the wing to retract the forward portion when the angle of attack is varied to maintain a lifting vacuum in proper position with relation to the upper side of the wing.

5. In an aeroplane, a wing pivoted intermediately of its width from front to rear, means to move the wing on its pivot, a flexible forward portion on the wing and means controlled by movement of the wing on its pivot to change the camber of the flexible forward portion comprising a plate pivoted within the wing connecting elements between the flexible forward portion and the pivoted plate and means to rock the plate upon movement of the wing on its pivot.

6. In an aeroplane, a wing pivoted with relation to the fuselage thereof, means to move the wing on its pivot to change the angle of attack without changing the contour of the bottom of the wing and means to automatically vary the camber of the forward portion in proportion to the change in angle of attack.

7. In an aeroplane, a wing pivoted with relation to the fuselage thereof, means to move the wing on its pivot to change the angle of attack without changing the contour of the bottom of the wing, a flexible forward portion on the wing having the front edge thereof pivoted to the nose of the wing and the rear edge slidable on the top of the wing and means to slide the rear edge of the flexible member on the top of the wing to vary the camber of the forward portion in proportion to the change in the angle of attack.

8. In an aeroplane, a wing pivoted with relation to the fuselage thereof, means to move the wing on its pivot to change the angle of attack without changing the contour of the bottom of the wing, a flexible forward portion on the wing having the front edge thereof pivoted to the nose of the wing and the rear edge slidable on the top of the wing and means controlled by movement of the wing on its pivot to slide the rear edge of the flexible member on the top of the wing to vary the camber of the forward portion.

9. In an aeroplane, a wing pivoted with relation to the fuselage thereof, means to move the wing on its pivot to change the angle of attack without changing the contour of the bottom of the wing, a flexible forward portion on the wing having the front edge thereof pivoted to the nose of the wing and the rear edge slidable on the top of the wing and means controlled by movement of the wing on its pivot to slide the rear edge of the flexible member on the top of the wing to vary the camber of the forward portion in proportion to the change in the angle of attack.

10. In an aeroplane, a wing pivoted with relation to the fuselage thereof, means to move the wing on its pivot to change the angle of attack without changing the contour of the bottom of the wing, a flexible forward portion on the wing having the front edge thereof pivoted to the nose of the wing and the rear edge slidable on the top of the wing and means to slide the rear edge of the flexible member on the top of the wing to vary the camber of the forward portion, said means being locked against movement except upon movement of the wing on its pivot.

WALTER D. MARING.